United States Patent [19]

Angenendt

[11] 3,783,575
[45] Jan. 8, 1974

[54] METHOD OF AND APPARATUS FOR STRAPPING AND LABELING OF OBJECTS

[75] Inventor: Jacob Anton Angenendt, Obersasbach, Germany

[73] Assignee: Hoesch Aktiengesellschaft, Dartmund, Germany

[22] Filed: Apr. 19, 1972

[21] Appl. No.: 245,402

[30] Foreign Application Priority Data
Apr. 21, 1971 Germany................... P 21 19 385.1

[52] U.S. Cl......................... 53/3, 53/198 R, 100/26
[51] Int. Cl............................................ B65d 15/00
[58] Field of Search................ 53/3, 14, 137, 198 R, 53/118; 100/26

[56] References Cited
UNITED STATES PATENTS
3,667,378  6/1972  Van de Bilt........................... 100/26
3,489,076  1/1970  Countryman ................. 53/198 R X
3,470,814  10/1969  Tschappu...................... 53/198 R X Primary Examiner—Andrew R. Juhasz
Assistant Examiner—W. D. Bray
Attorney—Michael S. Striker

[57] ABSTRACT

A strapping tape is guided in a predetermined path about the circumference of an object to be packed, and across its path there is placed a label having one or two openings through which the advancing tape is guided, whereupon the tape on completion of its encirclement of the object, is tightened and secured.

10 Claims, 7 Drawing Figures

PATENTED JAN 8 1974　　3,783,575

METHOD OF AND APPARATUS FOR STRAPPING AND LABELING OF OBJECTS

BACKGROUND OF THE INVENTION

The present invention relates generally to the strapping of objects to be packed, and more particularly to a method of effecting such strapping and to an arrangement for carrying out the method.

The strapping of objects, such as bales, crates and the like, is already well known and requires no detailed discussion herein. As strapping tape it is known to utilize metallic tape, usually steel or the like, synthetic plastic or other materials suitable for the purpose. The tape is placed about the circumference of an object to be so strapped, and is then tightened and its overlapping and adjacent ends are connected with one another. All of this is known, as is apparatus for carrying out the strapping operation.

It is, however, frequently desirable not only to strap the object but also to provide it with a label or ticket, for instance to identify its contents, the sender, the recipient or in fact to provide any desired type of identification or information. Until now this has been provided by writing onto the object, by adhesively affixing labels to it or by resorting to similar expedients. In many cases, however, this is not practical, in some instance because it is impossible to write on the object itself because of the surface consistency thereof, in other cases because labels will not adhere to the object or will tend to come off at a later time, and in still other cases these possibilities are found to be too time-consuming and/or too cumbersome.

SUMMARY OF THE INVENTION

It is, accordingly, a general object of the present invention to overcome this disadvantage of the prior art.

More particularly it is an object of the present invention to provide an improved method of strapping and labeling objects to be packed wherein the disadvantages outlined above are overcome.

An additional object is to provide an arrangement for carrying out the novel method.

In pursuance of these objects, and of others which will become apparent hereafter, one feature of the invention resides in the novel method of strapping and labeling objects to be packed which method, briefly stated, comprises the steps of providing a predetermined path for advancement of strapping tape about the circumference of an object to be packed, placing across this path a label having at least one opening which is dimensioned to admit the tape and which encircles the path, advancing the strapping tape in the path, through the opening and about the object, and tightening the strapping tape about the object.

The term "tape" as used herein is to be understood as referring to any type of strapping material that can be used for strapping of objects, that is metallic strip, synthetic plastic strip or any other suitable straps or strips.

The term "label" similarly is intended to designate any suitable type of ticket or identification-carrying means, such as synthetic plastic, metallic or other labels, tickets or the like.

It is particularly advantageous if the label is provided not only with one (preferably slot-shaped) opening, but with two which are spaced from one another and if the label is so held in the path of the advancing tape, that the tape will serially pass through both of these openings. The label is advantageously arcuately curved when it is held in position, so that the tape essentially performs a movement with respect to the curved label (as it moves successively through the two openings) which corresponds to the chord of an arc.

The novel arrangement for carrying out the method comprises, briefly stated, first means defining a predetermined path for advancement of a strapping tape about the circumference of an object to be packed, second means for retaining a label having at least one opening dimensioned to admit the tape, in a position extending across the path and with the opening encircling the same, and third means for advancing the tape in the path, through the opening, and about the circumference of the object.

The second means advantageously is a guide element of substantially U-shaped cross-section whose arms or legs are located at opposite lateral sides of the path extending in parallelism therewith and being provided with arcuate cutouts and abutments which retain the label in such a position that it follows the arcuate contour of the cutouts with its slit-shaped openings extending across the path ready for passage of the tape therethrough.

The arcuate contour of the cutouts should be so selected that the label can be readily pushed into these cutouts and be retained therein, so that it will not tend to "pop out", and abutments (which could be omitted) are advantageously provided which will retain the label in the cutouts.

Control means are advantageously provided in the region of the second means, such as brackets, levers, or the like, which permit the tape to be guided precisely through the openings of the label, and it is also advantageous to provide a supply arrangement, for instance a storage magazine, containing a supply of labels which are then fed to the second means. Such supply and feeding arrangements are already known from the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
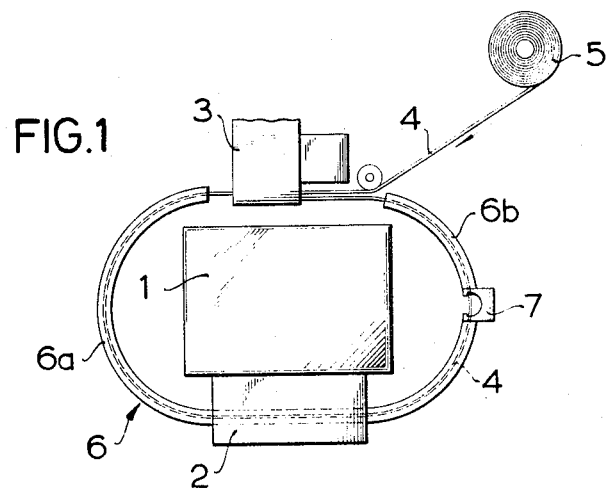
FIG. 1 is a diagrammatic side-elevational view, showing in principle an arrangement according to the invention.

Discussing firstly the principal illustration in FIG. 1 it will be seen that an object to be strapped is identified with reference numeral 1 and in this embodiment is positioned on a socket 2. Located above the object 1 is an automatically operating closing tool 3 which withdraws a strapping tape, here a strapping tape 4, from a supply roll 5 and advances it through the guide means 6 which encircles the object 1. The guide means in the illustrated embodiment is in form of U-shaped profiled members 6a and 6b which encircle the object 1 at opposite sides and the inner width of whose recess corresponds to the width of the strapping tape 4. They pass through an appropriate recess provided in the socket 2, or an additional U-shaped profile similar to them but straight, can be incorporated in the socket if desired.

In any case, the tool 3 (which requires no detailed discussion because it is known and not part of the invention) pushes the free end of the tape through the channel formed by the U-profiled elements 6a, 6b in the predetermined path defined by the guide arrangement 6 about the object 1 until the free end returns to the tool 3 to overlap with the still advancing portion of the tape which is being forwarded by the tool 3. The overlapping portions of the tape are then encircled by a sleeve member and the free end of the tape is fixed, for instance by bending it over against an abutment, whereas the direction of advancement of the tape is thereupon reversed so that the tape is tightened by moving back towards the supply roll 5. When sufficient tightening is achieved the advancement of the tape is terminated, the sleeve is crimped or cinched to hold tight the overlapping tape portions, and the tape is severed intermediate the tool and the roll 5.

The novel means for holding a label in such a position that it will become threaded onto the advancing tape 4, is designated with reference numeral 7 and associated with the portion 6b of the guide means 6.

Figure 2:
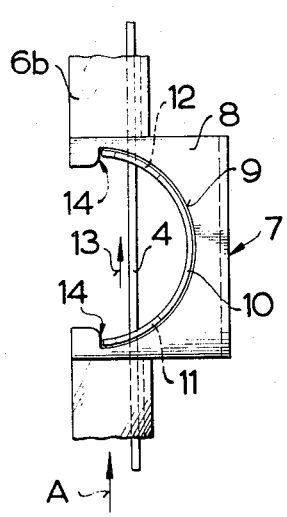
FIG. 2 is a fragmentary detailed view illustrating one embodiment of the invention.
Figure 3:
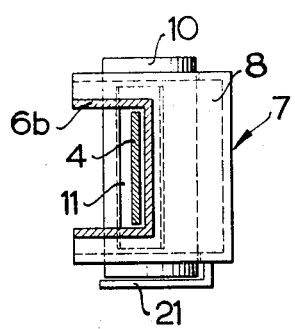
FIG. 3 is a section taken in FIG. 2.

According to one embodiment, illustrated in FIGS. 2 and 3, the novel means 7 utilizes a U-shaped profile member 8 which is inserted into the member 6b. The member 8 has a somewhat greater height than the member 6b and its arms which are located at opposite sides of the path to be traversed by the tape 4, are each provided with an arcuate cutout 9. These cutouts are in registry with one another across the path and a label 10 is placed into the cutouts so as to be held by the same in the illustrated arcuate contour.

As shown the label 10 is provided in the region of two of its parallel edges with openings here shown as slots or slits 11 and 12. After the label 10 is inserted into the cutouts 9, straddling the path of the tape 4, the openings 11 and 12 will be located exactly in the path of advancement of the tape 4 which advances in the direction of the arrow 13 and in so doing passes sequentially through the slits 11 and 12. In the illustrated embodiment the outer ends of the cutouts 9 are provided with abutments 14 against which the label 10 bears due to its tendency to straighten out, so that the label is reliably retained in its arcuate position. The embodiment shown in FIG. 2 is illustrated in FIG. 3 as seen in the direction of the arrow A associated with FIG. 2.

Figure 4:
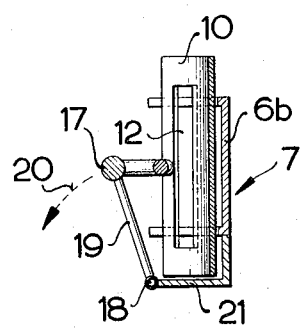
FIG. 4 is a view analogous to FIG. 2 but illustrating a further embodiment of the invention.
Figure 5:
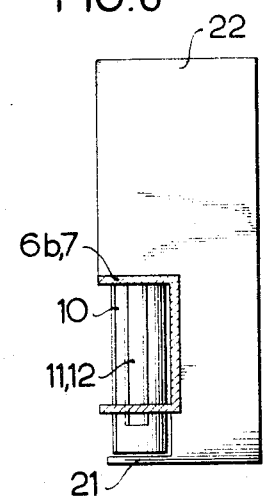
FIG. 5 is a section taken on line V—V of FIG. 4.

In FIGS. 4 and 5 I have illustrated a further embodiment where the arcuate cutouts 9 are provided directly in the arms of the U-shaped profiled member 6b of the guide arrangement 6. Because these arms are somewhat lower than those of the members 8 in FIGS. 2 and 3, the arc which can be given the cutouts 9 is somewhat flatter than previously, and for these reason they are provided additional guide means for the tape 4 in this embodiment, in form of the guide nose 15 and the bracket 16 which extends from a member 17 extending in parallelism with the member 6b. The guide means 15 and 16 so guide the strapping tape 4 which advances in the direction of the arrow 13 from below through the member 6b that it will pass through the openings 11 and 12 as desired.

When the tape is subsequently tightened the latter is withdrawn in the left-hand direction towards the object 1, and for this purpose the member 17 can be pivoted away (see FIG. 5) in the direction of the arrow 20 by means of an arm 19 which is pivoted at 18.

In both embodiments, that is in FIGS. 2 and 3 as well as in FIGS. 4 and 5, the proper positioning of the label in the transversely aligned or registering cutouts 9 is assured by the provision of edge abutment 21 at the underside of the respective member 8 or 6b, so that the slits 11 and 12 will always assume the proper position with respect to the transverse direction of the tape 4, as shown in FIGS. 3 and 5.

Figure 6:
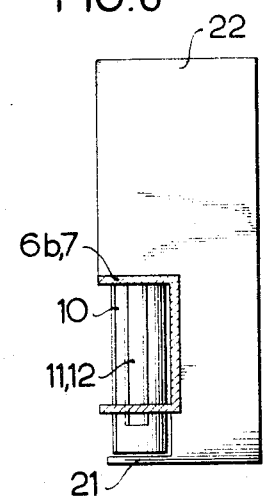
FIG. 6 illustrates somewhat diagrammatically an embodiment utilizing a magazine for supplying of labels.

FIG. 6 shows that there may additionally be provided a magazine 22 accommodating a supply of (not-illustrated) labels 10. This magazine may be analogous to the magazines which are already known for holding the sleeves which latter are used to crimp and connect the ends of the tape. In these sleeve magazines a sleeve is advanced to operative position with each strapping operation, and analogously a label can be advanced into the cutouts 9 with each strapping operation.

Figure 7:
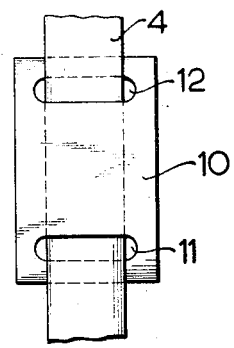
FIG. 7 is a fragmentary plane view, illustrating a label which is threaded onto the strapping tape.

How the label is threaded onto the strapping tape 4 when the operation is completed, is diagrammatically illustrated in FIG. 7.

Of course, when the label has been so threaded onto the tape 4, the tape can be drawn out of the inwardly directed open side of the guide arrangement 6, that is towards contact with the object 1, when the ends of the tape have been overlapped and connected and when the tape is to be tightened about the object 1. The pivoting of the bracket mentioned before, can be effected by the pull exerted by the tape itself against the force of a spring acting upon the bracket and counteracting such pivoting, or it can be effected by special means provided for this purpose, for instance hydraulic means.

The present invention, in which of course a label can also be used having only a single one of the openings 11, 12 or having more than two of them, assures in a very simple manner an automatic connection of a label with the strapping tape and thereby with the object 1, and this is effected not only much more rapidly than could be done by hand, but also can be carried out with the aid of a most simple arrangement which can readily be applied to already existing strapping devices.

It goes without saying, of course, that the tape 4 cannot only be placed about the object 1 by advancing it in an essentially vertical plane as illustrated in FIG. 1, but also that this can be done by advancing it in an essentially horizontal plane and that this will not effect the concept of the invention.

It will be understood that each of the elements described above, or two or more together, may also find a useful application in other types of constructions differing from the types described above.

While the invention has been illustrated and described as embodied in the strapping and labeling of an object, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of strapping and labeling objects to be packed, comprising the steps of providing a predetermined path for advancement of a strapping tape about the circumference of an object to be packed; placing across said path a label having at least one opening which is dimensioned to admit the tape and which is located in said path; advancing said strapping tape in said path, through said opening, and about said object; and tightening said strapping tape about said object.

2. A method as defined in claim 1, said label having an additional opening dimensioned similar to said one opening; wherein the step of placing said label comprises positioning the latter so that both openings are located in said path; and the step of advancing said strapping tape comprises advancing the same through both of said openings.

3. Arrangement for strapping and labeling of objects to be packed, comprising first means defining a predetermined path for advancement of a strapping tape about the circumference of an object to be packed; second means for retaining a label having at least one opening dimensioned to admit said tape, said second means being in a position extending across said path and with said opening being located in the same; and third means for advancing said tape in said path, through said opening, and about the circumference of said object.

4. Arrangement as defined in claim 3, said first means comprising a guide rail of substantially U-shaped cross-section.

5. Arrangement as defined in claim 3, said label having an additional opening similar to but spaced from said one opening and also being located in said path; and wherein said second means is operative for retaining said label in a position in which the latter is bowed away from said path and said openings are in at least substantial registry longitudinally of said path.

6. Arrangement as defined in claim 5, said second means comprising a guide element of substantially U-shaped cross-section, having two arms extending in parallelism with said path at opposite lateral sides thereof and being provided with respective arcuate cut-outs which register with one another transversely of said path.

7. Arrangement as defined in claim 6, each of said arms being provided in the region of the respective cut-outs with abutments for abutting and retaining said label when the same is received in said cutouts.

8. Arrangement as defined in claim 5; and further comprising control means in the region of said second means for controlling the movement of said tape through said openings.

9. Arrangement as defined in claim 8, said control means comprising a control element located intermediate said second means and the object to be packed, said control element being pivotable in a sense engaging and deflecting said tape in a desired direction.

10. Arrangement as defined in claim 3; further comprising supply means providing a supply of said labels, and feed means for feeding said labels to said second means for retention by the latter.

* * * * *